(12) United States Patent
Trim et al.

(10) Patent No.: US 11,856,139 B2
(45) Date of Patent: Dec. 26, 2023

(54) METHOD AND APPARATUS FOR DYNAMIC TONE BANK AND PERSONALIZED RESPONSE IN 5G TELECOM NETWORK

(71) Applicant: International Business Machines Corporation, Armonk, NY (US)

(72) Inventors: Craig M. Trim, Ventura, CA (US); Kimberly Greene Starks, Nashville, TN (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/448,783

(22) Filed: Sep. 24, 2021

(65) Prior Publication Data

US 2023/0101761 A1  Mar. 30, 2023

(51) Int. Cl.
*H04M 3/493* (2006.01)
*H04W 4/16* (2009.01)

(52) U.S. Cl.
CPC .......... *H04M 3/4936* (2013.01); *H04W 4/16* (2013.01)

(58) Field of Classification Search
CPC .............................. H04M 3/4936; H04W 4/16
See application file for complete search history.

(56) References Cited

U.S. PATENT DOCUMENTS

| | | | |
|---|---|---|---|
| 7,277,691 B1 | 10/2007 | Lundy et al. | |
| 7,941,126 B2 | 5/2011 | Malik | |
| 9,300,807 B2 | 3/2016 | Miller et al. | |
| 10,432,784 B2 | 10/2019 | Sapci | |
| 10,574,605 B2* | 2/2020 | Pinel | H04L 51/063 |
| 10,580,066 B1 | 3/2020 | Hazlewood et al. | |
| 2006/0031326 A1* | 2/2006 | Ovenden | G06Q 10/109 |
| | | | 709/206 |
| 2009/0124243 A1 | 5/2009 | Routley et al. | |
| 2010/0142685 A1* | 6/2010 | Dolan | H04M 15/06 |
| | | | 379/88.21 |
| 2010/0227602 A1 | 9/2010 | Zhang | |

(Continued)

OTHER PUBLICATIONS

Barcelos et al.; "Watch Your Tone: How A Brand's Tone of Voice On Social Media Influences Consumer Responses", Journal Of Interactive Marketing,pp. 60-80,vol. 41,Feb. 2018.

(Continued)

*Primary Examiner* — Minjung Kim
(74) *Attorney, Agent, or Firm* — Yee & Associates, P.C.

(57) ABSTRACT

Generating a personalized automated voice response in a telecommunications network is provided. An incoming call from a caller for user equipment of an operator in the telecommunications network is identified. In response to identifying the incoming call, it is determined whether to provide an automated response to the incoming call. In response to determining to provide the automated response to the incoming call, a personalized response message from the operator of the user equipment to the caller is generated based on characteristics of communications between the caller and the operator of the user equipment. The personalized automated voice response comprising the personalized response message in a synthesized voice of the operator of the user equipment is generated. The personalized automated voice response is sent to the caller.

16 Claims, 8 Drawing Sheets

(56) References Cited

U.S. PATENT DOCUMENTS

| | | | |
|---|---|---|---|
| 2014/0205076 A1* | 7/2014 | Kumar | H04M 7/0033 |
| | | | 379/142.01 |
| 2015/0148014 A1 | 5/2015 | Gupta et al. | |
| 2016/0261742 A1* | 9/2016 | Offen | H04M 3/4288 |
| 2016/0299969 A1 | 10/2016 | Joyner | |
| 2019/0158663 A1* | 5/2019 | Dowlatkhah | H04W 64/00 |
| 2020/0243062 A1* | 7/2020 | Scodary | H04M 3/493 |
| 2020/0389553 A1 | 12/2020 | Goldstein | |
| 2021/0120124 A1* | 4/2021 | Czarnecki | H04L 51/02 |
| 2021/0160570 A1 | 5/2021 | Webster et al. | |
| 2022/0353364 A1* | 11/2022 | Czarnecki | H04M 3/42382 |
| 2022/0383888 A1* | 12/2022 | Pichaimurthy | G10L 21/0272 |

OTHER PUBLICATIONS

Hu et al.; "Touch Your Heart: A Tone-Aware Chatbot For Customer Care On Social Media", Cornell University Library, arXiv:1803.02952v2, pp. 1-12, Mar. 15, 2018.

Lanovaz et al.; "Comparing The Communication Tone And Responses . . . Positive And Negative Emails", MS IEEE Software, vol. 36, Iss. 5, pp. 46-50, Sep.-Oct. 2019.

Cong et al.; "Data Efficient Voice Cloning From Noisy Samples With Domain Adversarial Training", ICSA Interspeech, pp. 811-815, Oct. 25-29, 2020.

Volkova et al.; "Inferring Perceived Demorgraphics From User Emotional Tone . . . Emotional Constrast", ACL 54th Annual Meeting Of, vol. 1, pp. 1567-1578, Aug. 7-12, 2016.

\* cited by examiner

FIG. 5

| CONTACT NAME/NUMBER | TYPE | TAGS |
|---|---|---|
| JOHN OFFICE | PROFESSIONAL | WORK, TEAMMATE, ENGLISH |
| MOM | FAMILY | HOME, MOTHER, FAMILY, HINDI |
| SONNU | FAMILY | KID, 12-YEAR-AGE, FAMILY, HINDI |
| ⋮ | ⋮ | ⋮ |

FIG. 6

| CONTACT NAME/NUMBER | TIME | PROBABILITY DISTRIBUTION |
|---|---|---|
| JOHN OFFICE | 10AM-12PM, 2PM-4PM | 70%, 30% |
| MOM | 7AM-9AM, 8PM-10PM | 25%, 75% |
| SONNU | 10AM-12PM, 2PM-4PM, 7AM-9AM, 8PM-10PM | 20%, 25%, 30%, 25% |
| ⋮ | ⋮ | ⋮ |

METHOD AND APPARATUS FOR DYNAMIC TONE BANK AND PERSONALIZED RESPONSE IN 5G TELECOM NETWORK

BACKGROUND

1. Field

The disclosure relates generally to telecommunications networks and more specifically to personalized automated voice responses to calls in telecommunications networks.

2. Description of the Related Art

Telecommunications networks may provide for automated voice responses to calls that are not completed. For example, an automated voice response may be provided to a caller when the person being called is unable or unwilling to answer the call. The automated voice response may be a recording made by the person being called or a voice synthesized by a computer.

Computer synthesized voices may be combined with artificial intelligence in a telecommunications system to provide a virtual assistant that is able to interpret human speech and respond via synthesized voices. A virtual assistant may also be referred to as an intelligent virtual assistant or intelligent personal assistant. A virtual assistant is a software agent that can perform various tasks or services for an individual based on commands or questions. For example, a user may ask a virtual assistant questions, control home automation devices and media playback via voice, and manage other basic tasks such as email, to-do lists, and calendars with verbal commands. As another example, a virtual assistant may assist a user in the installation or trouble shooting of information technology systems.

In telecommunications, 5G refers to the fifth generation technology standard for broadband cellular networks. Enhanced mobile broadband is one of the aspects of 5G networks that provides faster wireless connections and extends cellular coverage, including to cover previously underserved areas. Enhanced mobile broadband also provides support for more devices and more data in densely populated areas and enables high-bandwidth applications such as augmented and virtual reality.

5G telecom networks support more sophisticated mechanisms for traffic differentiation than those of legacy systems, in order to fulfill diverse and more stringent end-to-end Quality of Service (QoS) requirements. 5G telecom networks provide for the separation and prioritization of resources on a common infrastructure for operational and security purposes. Further, 5G telecom networks offer many in-built artificial intelligence functions as part of the service orchestration layer. These artificial intelligence features may be leveraged to improve the telecommunications experience of users of the network.

SUMMARY

According to one illustrative embodiment, a computer-implemented method of generating a personalized automated voice response in a telecommunications network is provided. A computer identifies an incoming call from a caller for user equipment of an operator in the telecommunications network. In response to the computer identifying the incoming call, the computer determines whether to provide an automated response to the incoming call. In response to the computer determining to provide the automated response to the incoming call, the computer generates a personalized response message from the operator of the user equipment to the caller based on characteristics of communications between the caller and the operator of the user equipment. The computer generates the personalized automated voice response comprising the personalized response message in a synthesized voice of the operator of the user equipment and sends the personalized automated voice response to the caller.

According to other illustrative embodiments, a computer system and computer program product for generating a personalized automated voice response in a telecommunications network are provided.

BRIEF DESCRIPTION OF THE DRAWINGS

FIG. 5 is an illustration of a tag library in accordance with an illustrative embodiment;

FIG. 6 is an illustration of call estimation probability in accordance with an illustrative embodiment;

DETAILED DESCRIPTION

Figure 1:
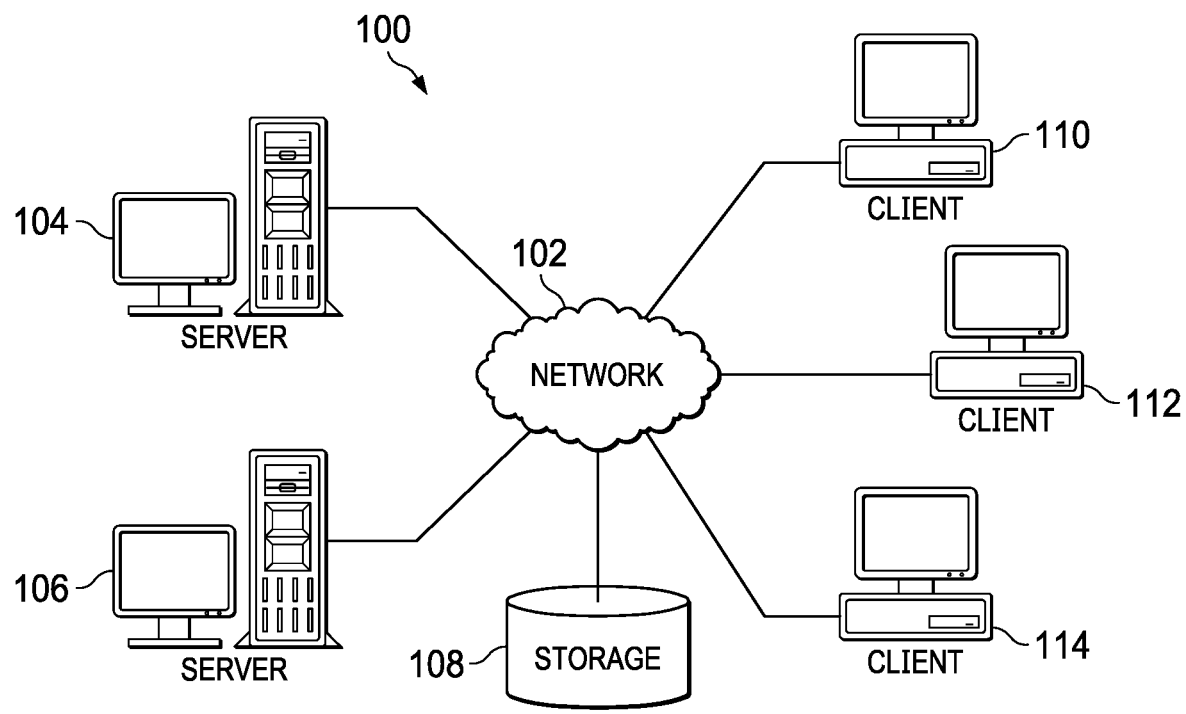
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account various considerations. For example, the illustrative embodiments recognize and take into account that currently automated voice responses to calls in telecommunications systems lack the personalized touch. Current telecommunications tone banks for automatic response are very static and do not include any dynamic, user-driven attributes that can give the personalized touch to the communication. Currently, the tones used for automatic responses are highly hard coded and cover limited scenarios, such as the person being called is busy, on-hold, or the like. The tone banks of current telecommunications service providers have very limited flavors, and the tones are directed to selective occasions only. This typically includes busy tone, dialing tone and a few other traditional tones like a voice recorder.

Current telecommunications systems do not provide a way to detect whether the person being called is busy on other channels and accordingly the call can be directed to send autonomous voice response to the caller. For example, when the person being called is in a web conferencing meeting, there is currently no way by which this can be determined and incoming calls put on busy mode proactively and callers notified using the voice of the person being called. In such cases today, manual intervention is needed to reject the call or respond to the call and update the caller in person. The messages currently generated when the person rejects the call are emotionless and no personalized information is carried in such messages which results in unpleasant communication.

The illustrative embodiments provide for the generation and delivery of personalized automated voice responses to calls in a telecommunications network. For example, illustrative embodiments may generate a personalized automated voice response to a caller in the telecommunications network when the operator of user equipment in the telecommunications network that is being called is on another call or otherwise cannot or will not respond to the call in person. The personalized automated voice response is delivered in the voice of the operator of the user equipment. The content of the personalized automated voice response and the tone of the voice in which the personalized automated voice response is delivered may be personalized for the particular caller and situation.

Illustrative embodiments analyze communications between a caller and the operator of user equipment on the telecommunications network over time to determine characteristics of communications between the caller and the operator of the user equipment. For example, illustrative embodiments may identify commonly spoken words, names, favorite nicknames, languages, relationships and other information in the content of communications between the caller and the operator of the user equipment to determine characteristics of the communications between the caller and the operator of the user equipment. The determined characteristics of the communications between the caller and the operator of the user equipment is used to generate the contents of a personalized response message to the caller based on the current situation when the operator of the user equipment being called is on another call or otherwise cannot or will not respond to the call in person. The illustrative embodiments may use the voice of the operator of the user equipment in previous voice communications between the caller and the operator of the user equipment and voice cloning to synthesize a personalized automated voice response comprising the personalized response message in the synthesized voice of the operator of the user equipment. The personalized automated voice response then may be delivered to the caller. The personalized automated voice response may be saved in a personalized tone bank for the operator of the user equipment for future use.

With developments in voice cloning technologies, there are various artificial intelligence systems that can generate human voices based on simple learning. Voice cloning is expected to have significant applications in the personalization of human-machine interfaces. For example, when you are on another call and your kid attempts calling you, then the kid gets the same "busy" tone same as for adult. Though we generally speak with our kids with different set of words, with pet names and more affection, but this is not reflected in the automated tones. The tone bank response is always "The person is busy, please try again later . . . ". If the message could be "Heyyy Sonnu, momma is busy now . . . Momma will call you once the meeting is over . . . Take care . . . ". Such messages will give more personalized approach to the communication.

Illustrative embodiments may be implemented in a 5G broadband cellular communication network. For example, illustrative embodiments may be implemented to operate with the service orchestration layer of a 5G network in conjunction with user equipment in the 5G network. Illustrative embodiments may identify and process the omnichannel information for user equipment instances to generate personalized automated voice responses using voice cloning techniques.

The illustrative embodiments comprise two processes that includes a user equipment instance and a service instance in the edged cloud of the 5G network. The client instance is situated at the user equipment location and collects information about omnichannel data communication to the user equipment device. The mechanism locates the time to call mappers and builds the call portfolio which are expected during the time and accordingly instructs the voice generator with an appropriate customized message.

The client instance issues the enquiry and asks for the permission to allow the service instance to trace the words spoken with the person and access of user's contact list. When the user allows the permission to access the contact and spoken word determination, then the service orchestration layer monitors for the user calls to get the voice pattern for the pair. The service instance comprises in-band MAC based APIs communicating to the voice cloning engine and the maintains the user voice database. The voice calling channels created to the UE device are traced to get the frequently used words, inclusion of pet names, etc. and will be saved in the metadata mapper objects. Relationship of the users are extracted, and voice-to-age identification is performed at the service instance to offer more personalized response. The system articulates the relation, age, communication type (family, professional, etc.), communication preference with user and accordingly tag the contacts.

The illustrative embodiments analyze communication content exchanged between the users to carve information insights like spoken words, names, favorite nicknames, communication language, relationship along with other dynamic parameters and detects for necessities like user's frequency to access the data, voice tone selection and the message to be delivered considering user's personality insights DB, history, the nature of people, area, and autonomously frames the communication with caller when initiated, based on derived insights which provides the inputs to the voice cloning engine to frame the natural language communication.

When any call attempt is received and the client UE instance detects the user busy signal, (could be from same of different voice channels), then the information is commutated to the service instance using MAC based communication API tunnel established in between the instances. This is used as a trigger message for the personalized tone generator. Upon reception of this information, the reason is exacted from the UE message and accordingly further processing is initiated. The user tags are collected and accordingly the natural language processing techniques are invoked to get the new personalized sentence for response. The sentence is supplied to the voice duplication engine with the user identity and respect voice frames are received. This voice message comprises personalized voice and contents, with user's voice and this will be transferred to the caller.

As the callers are getting more personalized information in the response tone, this gives a more pleasant user experience. For example, when your kid calls you, and you are busy in a meeting, then the dynamic tone generator will recognize that you have call from your kid, his nickname is Sonnu, and accordingly formulates the proactive response indicating you are busy. The receiver gets the personalized message over the telco-tone which enriches overall experience.

For example, without limitation, some benefits of the illustrative embodiments include the following. It improves the customer interaction and offer personalized touch to the communication. Auto-communication experience and the Engauge tone will be personalized and dynamic based on the situation. The illustrative embodiments provide improved understanding of the message as the voice message is portrayed in personal language. Illustrative embodiments provide a better way to send situational information without actually sending the voice command, the system proactively detects for the situation and articulates insights. Dynamic conversation framing and voice closing helps better understanding and offers natural touch to the conversation. Automated response in NOC mode gives pleasant user experience.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client computers 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
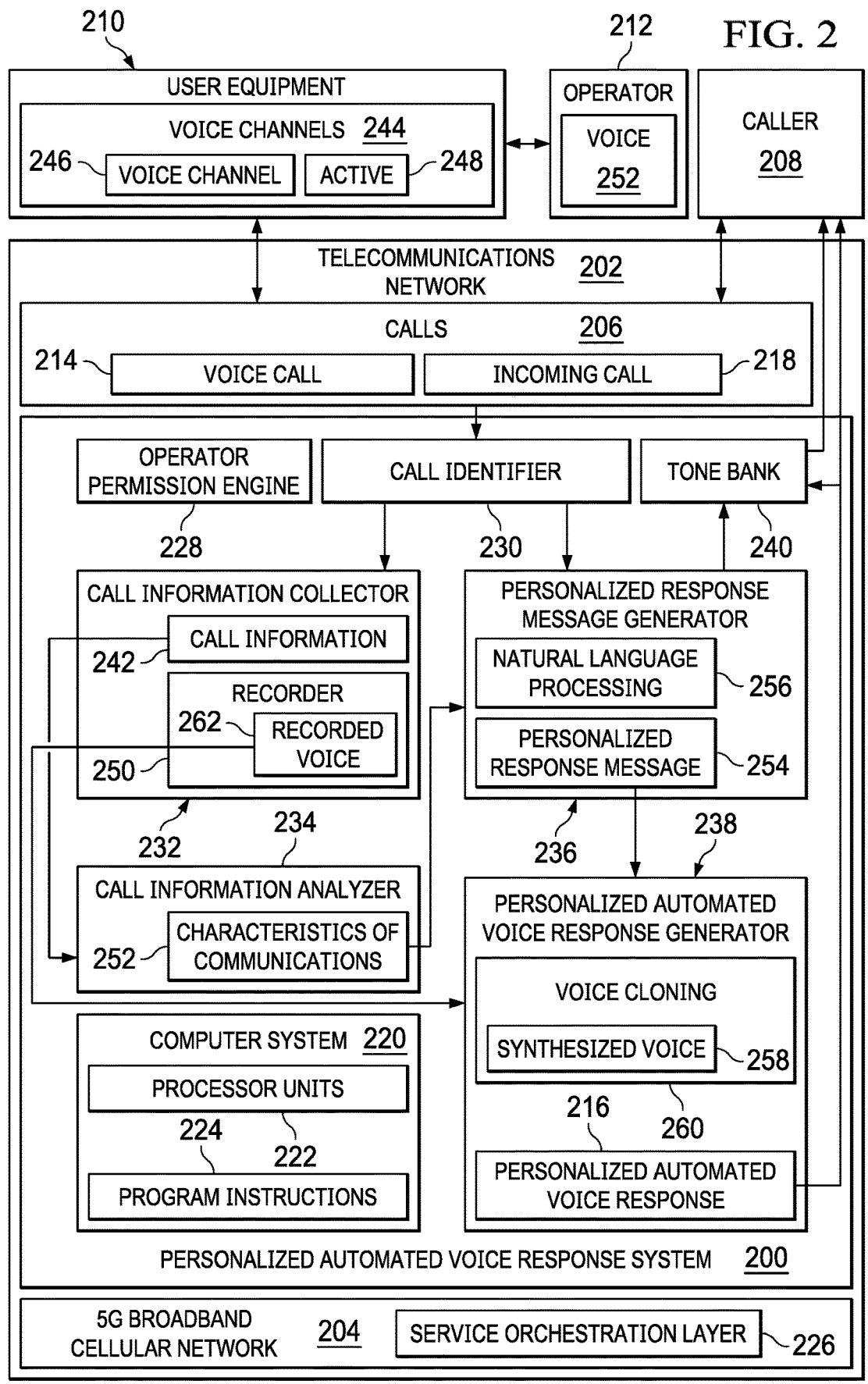
FIG. 2 is a block diagram of a personalized automated voice response system in a telecommunications network in accordance with an illustrative embodiment.

Turning to FIG. 2, a block diagram of personalized automated voice response system 200 in telecommunications network 202 is depicted in accordance with an illustrative embodiment. For example, without limitation, telecommunications network 202 may be 5G broadband cellular network 204. Illustrative embodiments may be implemented in other appropriate telecommunications networks.

Telecommunications network 202 provides for the transmission of calls 206 between caller 208 and user equipment 210 of operator 212. User equipment 210 may include any device used by operator 212 to communicate via telecommunications network 202. For example, without limitation, user equipment 210 may be a hand-held mobile telephone, a laptop computer equipped with a mobile broadband adapter, or any other appropriate device. Calls 206 may include voice call 214.

Personalized automated voice response system 200 is configured to generate personalized automated voice response 216 to caller 208 when operator 212 cannot or will not respond in person to incoming call 218 from caller 208 to user equipment 210 of operator 212. As depicted, personalized automated voice response system 200 comprises computer system 220.

Personalized automated voice response system 200 can be implemented in software, hardware, firmware or a combination thereof. When software is used, the operations performed by personalized automated voice response system 200 can be implemented in program instructions configured to run on hardware, such as a processor unit. When firmware is used, the operations performed by personalized automated voice response system 200 can be implemented in program instructions and data and stored in persistent memory to run on a processor unit. When hardware is employed, the hardware may include circuits that operate to perform the operations in personalized automated voice response system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 220 is a physical hardware system and includes one or more data processing systems. When more than one data processing system is present in computer system 220, those data processing systems are in communication with each other using a communications medium. The communications medium can be a network. The data processing systems can be selected from at least one of a computer, a server computer, a tablet computer, or some other suitable data processing system. Computer system 220 is an example of one or more computers or computing devices in FIG. 1, in which computer-readable program code or instructions can be located in which the program code or instructions generate a personalized automated voice response in a telecommunications network 202.

As depicted, computer system 220 includes a number of processor units 222 that are capable of executing program instructions 224 implementing processes in personalized automated voice response system 200 when personalized automated voice response system 200 includes software. As used herein, a processor unit in the number of processor units 222 is a hardware device and is comprised of hardware circuits such as those on an integrated circuit that respond and process instructions and program code that operate a computer. When a number of processors units 222 execute instructions for a process, the number of processors units 222 is one or more processor units that can be on the same computer or on different computers. In other words, the process can be distributed between processors units on the same or different computers in a computer system. For example, processes for implementing personalized automated voice response system 200 may be implemented in one or more processor units 222 in user equipment 210 and one or more processor units 222 in service orchestration layer 226 of 5G broadband cellular network 204.

Further, the number of processors units 222 can be of the same type or different types of processors units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Personalized automated voice response system 200 includes operator permission engine 228, call identifier 230, call information collector 232, call information analyzer 234, personalized response message generator 236, personalized automated voice response generator 238, and tone bank 240.

Illustrative embodiments use call information 242 for calls 206 received by user equipment 210 of operator 212 over time. Operator permission engine 228 is configured to request permission from operator 212 to collect call information 242. Operator permission engine 228 also may record whether or not operator 212 has granted permission to collect call information 242.

Call identifier 230 is configured to identify incoming call 218 for user equipment 210 and to determine whether personalized automated voice response 216 will be generated for incoming call 218. For example, without limitation, user equipment 210 may include number of voice channels 244. If one voice channel 246 in number of voice channels 244 is active 248 when incoming call 218 is received, it may be determined that operator 212 is busy and, therefore, that personalized automated voice response 216 will be generated for incoming call 218. In this case, processing may pass to personalized response message generator 236. However, if incoming call 218 is answered by operator 212, processing may pass to call information collector 232.

If incoming call 218 is answered, call information collector 232 collects call information 242 about the call. The collected call information 242 may include information identifying caller 208 and words or phrases between caller 208 and operator 212 during the call. Call information collector 232 also may include recorder 250 for recording voice 252 of operator 212 during the call. Call information 242 for calls 206 between caller 208 and operator 212 over time is analyzed by call information analyzer 234 to identify characteristics of communications between caller 208 and operator 212 of user equipment 210.

If incoming call 218 identified by call identifier 230 will not be answered in person by operator 212, personalized response message generator 236 generates personalized response message 254 to caller 208 using characteristics of communications between caller 208 and operator 212 as determined by call information analyzer 234 and natural language processing 256. Personalized response message 254 is processed by personalized automated voice response generator 238 to generate personalized automated voice response 216 in synthesized voice 258 that imitates voice 252 of operator 212. Synthesized voice 258 may be generated using voice cloning 260 and recorded voice 262 of operator 212.

Personalized automated voice response 216 is then delivered to caller 208. Personalized automated voice response 216 also may be saved in tone bank 240 for possible reuse.

In 5G broadband cellular network 204, everything is communicated as part of IP packets. Therefore, in 5G broadband cellular network 204, illustrative embodiments may also be operated over the IP network. Therefore, it is relatively simple to collect call information using metadata tracing calls 206 and other applications installed on user equipment 210. The illustrative embodiments poll for all the application channels that are created for the voice communication. There is one default voice channel created by user equipment 210 that will be used for voice calls. Calls via other applications, such as WebEx, WhatsApp, and the like, need to be diverted via other voice channels. An instance of the illustrative embodiment running in user equipment 210 locates for the active voice enabled channel and accordingly decides to push the personalized tone management. When one voice channel is active on user equipment 210, and user equipment 210 receives another incoming call over another channel, then the client instance detects this and sends the message to the service orchestration layer for personalize response building and tone generation.

In this illustrative example, personalized automated voice response system 200 includes components that may be implemented in hardware, such as the hardware shown in network data processing system 100 in FIG. 1. For example, without limitation, personalized automated voice response system 200 and user equipment 210 may be implemented in hardware.

The illustration of personalized automated voice response system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
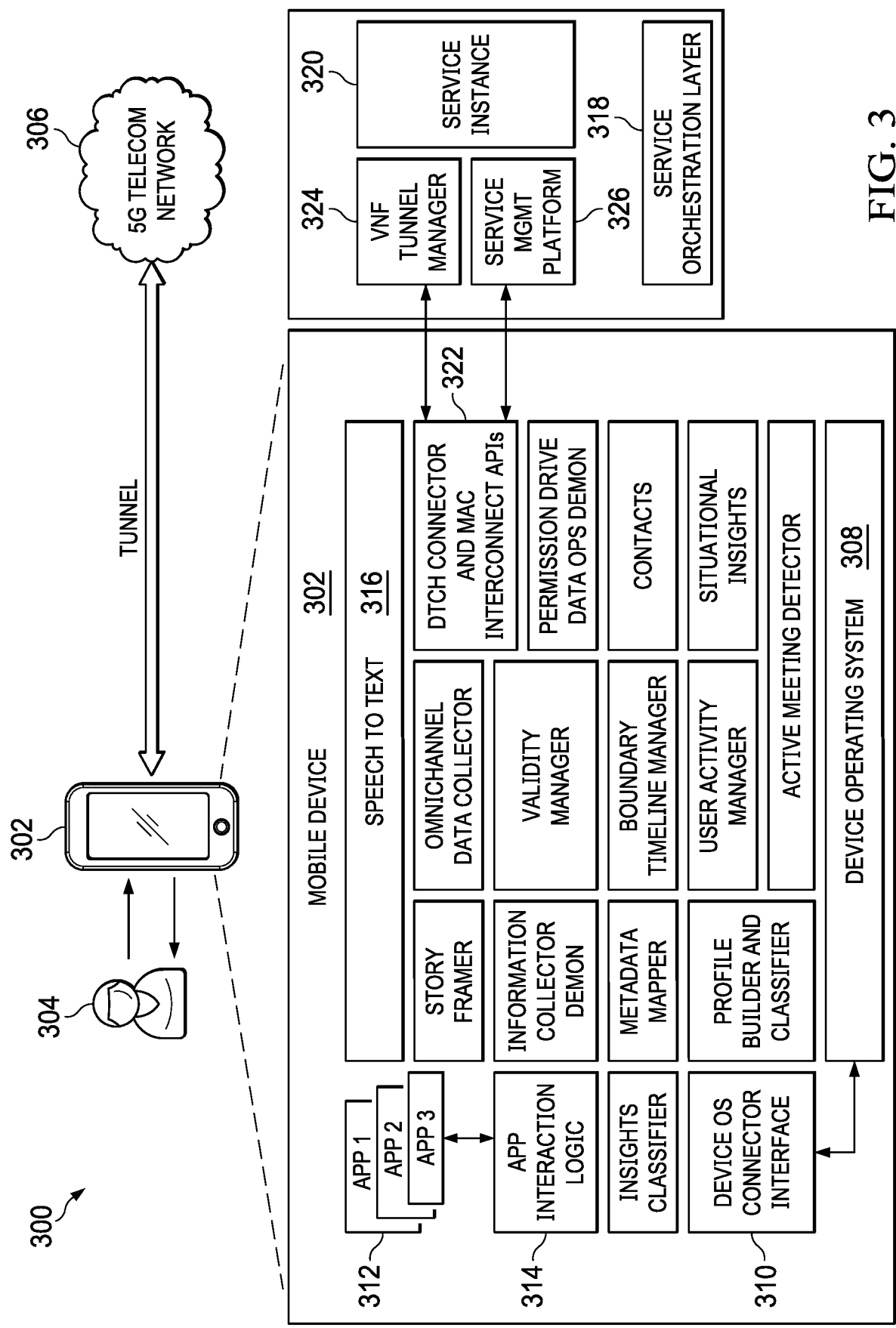
FIG. 3 is a block diagram of a system architecture for a personalized automated voice response system in accordance with an illustrative embodiment.

Turning to FIG. 3, block diagram of system architecture 300 for a personalized automated voice response system is depicted in accordance with an illustrative embodiment. System architecture 300 is an example of one implementation of a system architecture for personalized automated voice response system 200 in FIG. 2. In this example, illustrative embodiments are implemented for mobile device 302 of operator 304 in 5G telecommunications network 306. Mobile device 302 is an example of user equipment 210 in FIG. 2.

Mobile device 302 includes device operating system 308 and device operating system connector interface 310. Various applications 312 may be implemented on mobile device 302 which includes appropriate application interaction logic 314. Mobile device 302 may include other standard functionality, such as speech to text 316. Functionality for the implementation of illustrative embodiments on mobile device 302 includes insights classifier, story framer, information collector, metadata mapper, profile builder and classifier, omnichannel data collector, validity manager, boundary timeline manager, user activity manager, permission drive data operations demon, contacts, situational insights, and active meeting detector.

Other functionality for the implementation of illustrative embodiments is implemented remotely from mobile device 302 on service orchestration layer 318 of 5G telecom network 306. For example, service instance 320 may be implemented in service orchestration layer 318. Communication between mobile device 302 and service orchestration layer 318 is provided via DTCH connector and MAC interconnect application programming interface 322 on mobile device 302 and VNF tunnel manager 324 and service management platform 326 in service orchestration layer 318.

Figure 4:
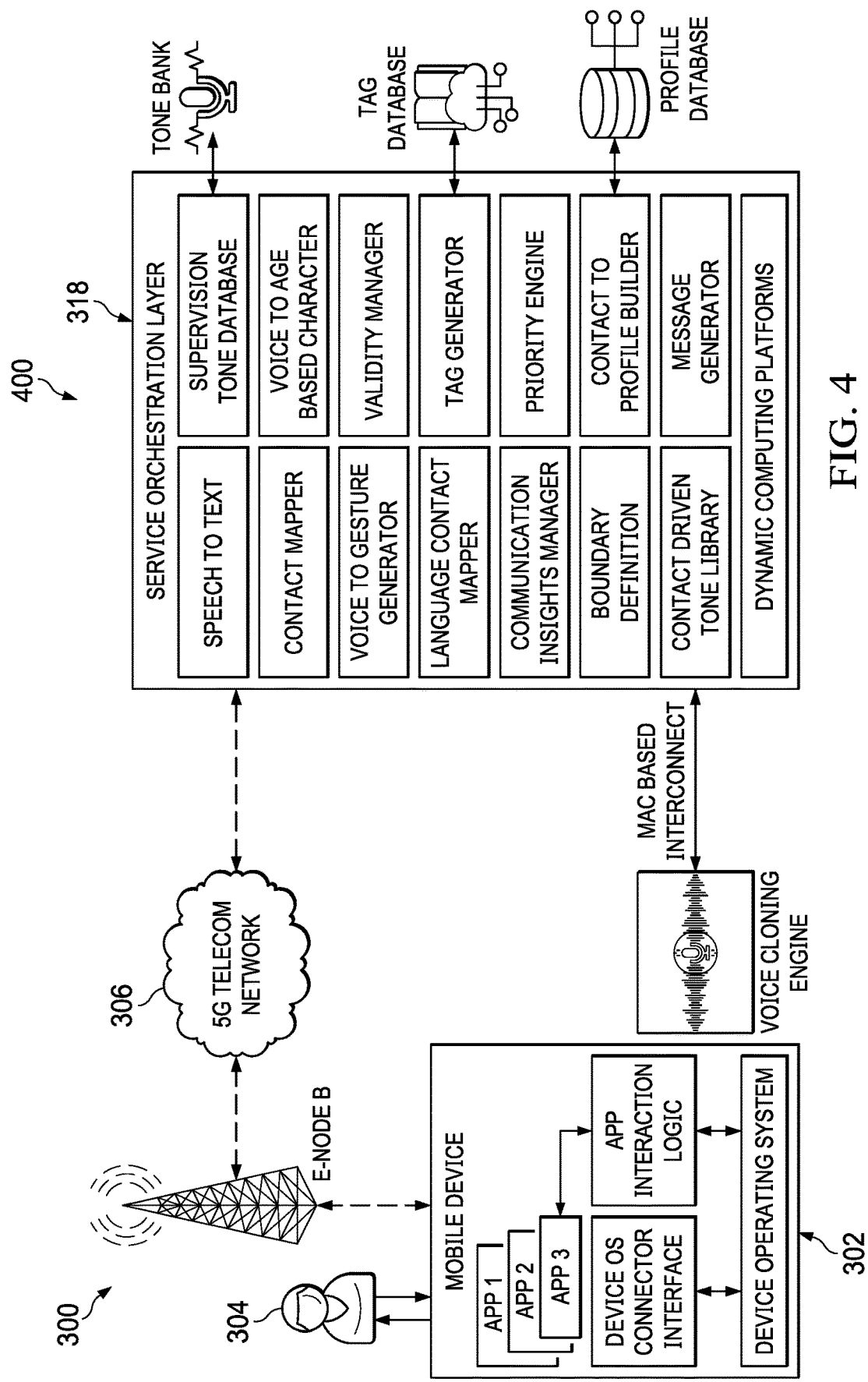
FIG. 4 is a block diagram of a service management framework for a personalized automated voice response system in accordance with an illustrative embodiment.

Turning to FIG. 4, a block diagram of service management framework 400 for a personalized automated voice response system is depicted in accordance with an illustrative embodiment. Service management framework 400 shows in more detail portions of system architecture 300 in FIG. 3 implemented in service orchestration layer 318 of 5G telecommunications network 306.

Turning to FIG. 5, an illustration of tag library 500 is depicted in accordance with an illustrative embodiment. Tag library 500 provides a summary of call information for calls between various callers and an operator of user equipment.

Callers are identified in column 502 of tag library 500. The type of relationship between each of the callers and the operator of the user equipment is identified in column 504 of tag library 500. Other call information that is collected from calls between each of the callers and the operator of the user equipment is stored as tags in column 506 of tag library 500.

Turning to FIG. 6, an illustration of call estimation probability is depicted in accordance with an illustrative embodiment. In accordance with an illustrative embodiment Call estimation probability table illustrates probability distribution 602 of calls being received from various callers 604 during various blocks of time 606.

Figures 7, 8:
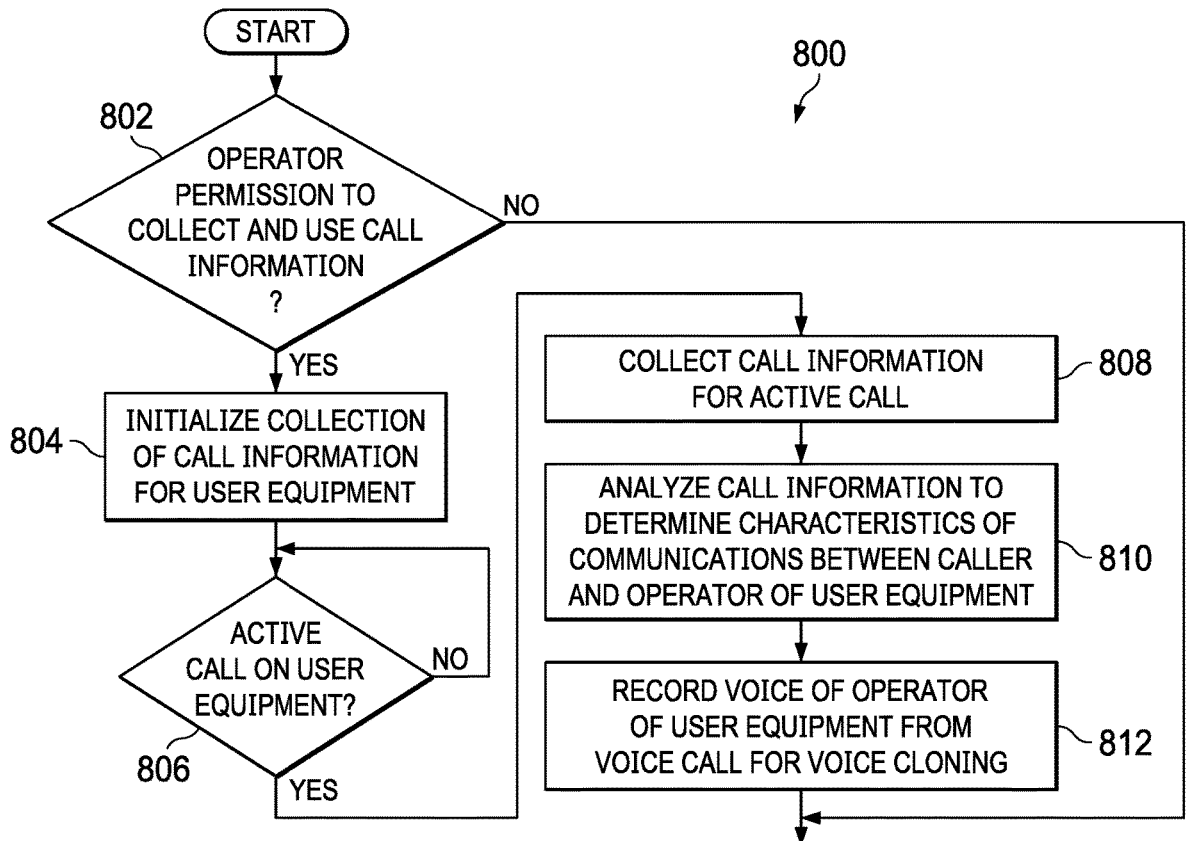
FIG. 7 is an illustration of a personalized tone bank in accordance with an illustrative embodiment.
FIG. 8 is an illustration of a flowchart of a process for collecting call information for generating a personalized automated voice response in accordance with an illustrative embodiment.

Tuning to FIG. 7, an illustration of personalized tone bank 700 is depicted in accordance with an illustrative embodiment. Personalized tone bank 700 identifies the personalized tone messages 702 that are delivered automatically to various callers 704 during specified time periods 706.

Turning to FIG. 8, an illustration of a flowchart of process 800 for collecting call information for generating a personalized automated voice response is depicted in accordance with an illustrative embodiment. Process 800 may be implemented in personalized automated voice response system 200 in FIG. 2.

Process 800 begins with determining whether the operator of user equipment has given permission to collect and use call information from the user equipment to generate personalized automated voice responses (operation 802). If the operator has not given permission, the process terminates thereafter.

In response to a determination at operation 802 that the operator has given permission to collect and use call information, the collection of call information for the user equipment is initialized (operation 804). The process then awaits an active call on the user equipment (operation 806).

In response to identifying an active call on the user equipment at operation 806, call information for the active call is collected (operation 808). The call information is analyzed to determine characteristics of communications between a caller and the operator of the user equipment (operation 810). The voice of the operator of the user equipment from a voice call may be recorded for voice cloning (operation 812), with the process terminating thereafter.

Figure 9:
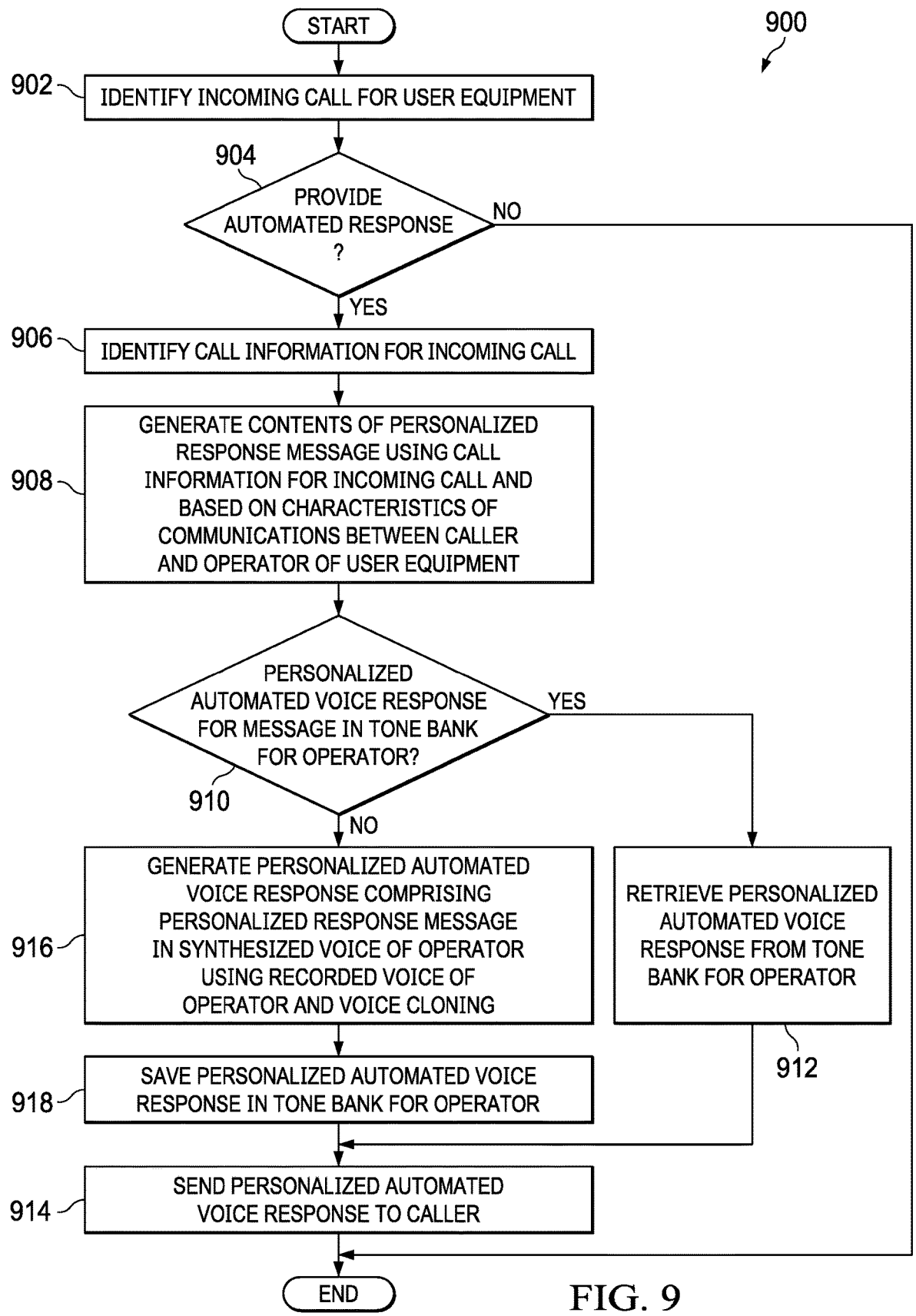
FIG. 9 is an illustration of a flowchart of a process for generating a personalized automated voice response in accordance with an illustrative embodiment.

Turning to FIG. 9, an illustration of a flowchart of process 900 for generating a personalized automated voice response is depicted in accordance with an illustrative embodiment. Process 900 may be implemented in personalized automated voice response system 200 in FIG. 2.

Process 900 begins with identifying an incoming call for user equipment (operation 902). It is determined whether an automated response to the incoming call will be provided (operation 904). If an automated response will not be provided, the process terminates thereafter.

In response to a determination at operation 904 that an automated response will be provided, call information for the incoming call is identified (operation 906). The contents of a personalized response message is then generated using the call information for the incoming call and based on characteristics of communications between the caller and the operator of the user equipment (operation 908). It is then determined whether a personalized automated voice response for the contents of the personalized response message is saved in a tone bank for the operator of the user equipment (operation 910). If the personalized automated voice response is in the tone bank for the operator, it is retrieved from the tone bank (operation 912) and sent to the caller (operation 914), with the process terminating thereafter.

In response to a determination at operation 910 that the desired personalized automated voice response is not in the tone bank, a personalized automated voice response comprising the personalized response message in a synthesized voice of the operator of the user equipment is generated using a recording of the voice of the operator of the user equipment and voice cloning (operation 916). The personalized automated voice response is saved in the tone bank for the operator of the user equipment for possible future use (operation 918) and sent to the caller (operation 914), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
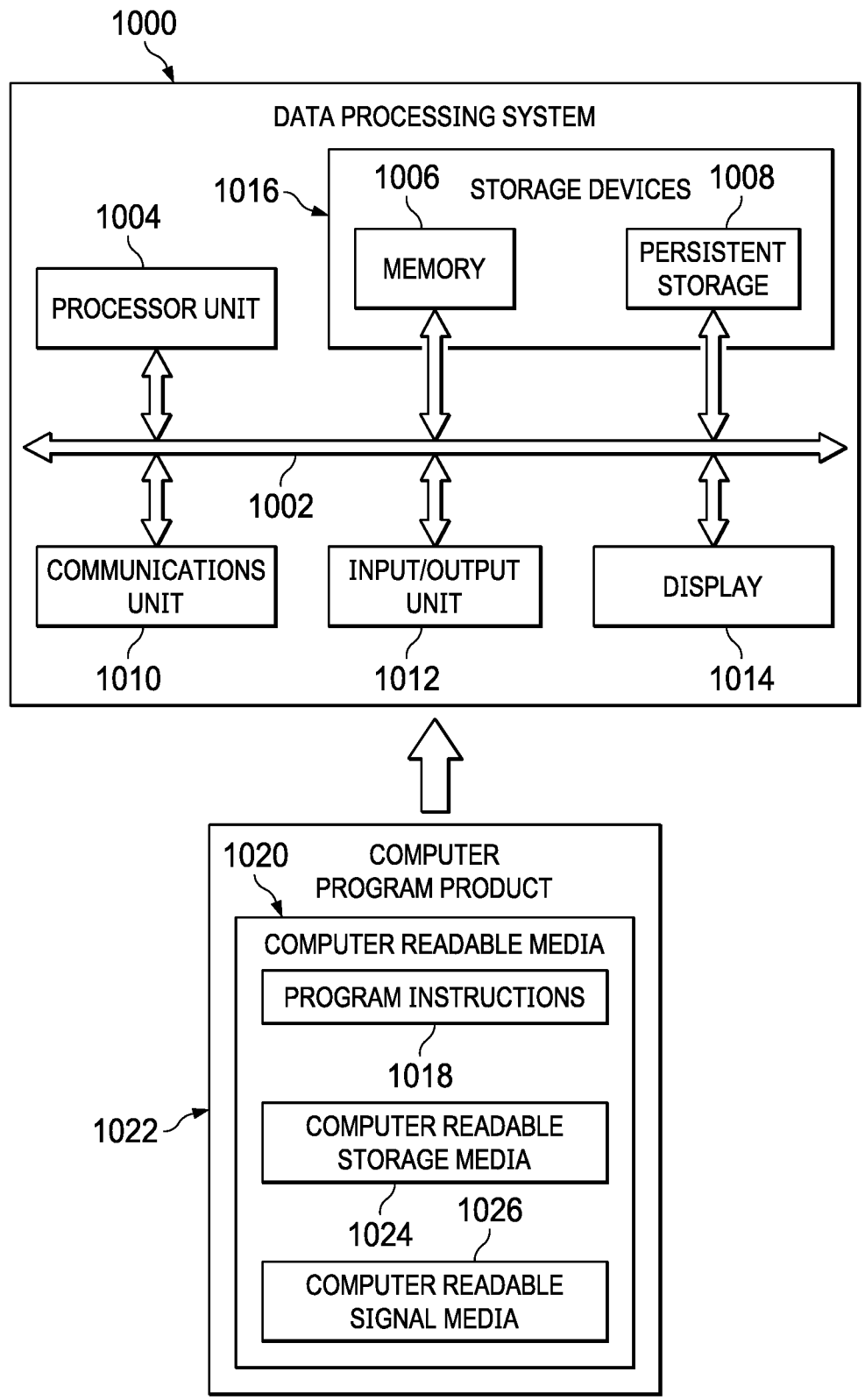
FIG. 10 is a block diagram of a data processing system in accordance with an illustrative embodiment.

Turning to FIG. 10, a block diagram of data processing system 1000 is depicted in accordance with an illustrative embodiment. Data processing system 1000 can be used to implement server computer 104, server computer 106, client computer 110, client computer 112, and client computer 114 in FIG. 1. Data processing system 1000 is an example of one possible implementation of computer system 220 on which personalized automated voice response system 200 in FIG. 2 is implemented. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program instruction 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program instructions 1018 rather than a medium that propagates or transmits program instructions 1018.

Alternatively, program instructions 1018 can be transferred to data processing system 1000 using a computer-readable signal media. The computer-readable signal media can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of generating a personalized automated voice response in a telecommunications network, comprising:
    identifying, by a computer, an incoming call from a caller for user equipment of an operator in the telecommunications network;
    responsive to the computer identifying the incoming call, determining, by the computer, whether to provide an automated response to the incoming call;
    responsive to the computer determining to provide the automated response to the incoming call, generating, by the computer, a personalized response message from the operator of the user equipment to the caller based on characteristics of communications between the caller and the operator of the user equipment;
    recording, by the computer, a voice of the operator of the user equipment from a voice call between the caller and the operator of the user equipment;
    generating, by the computer, the personalized automated voice response comprising the personalized response message in a synthesized voice of the operator of the user equipment using the recorded voice of the operator of the user equipment and voice cloning; and
    sending, by the computer, the personalized automated voice response to the caller.

2. The computer-implemented method of claim 1, wherein the personalized automated voice response is generated by the telecommunication network and automatically sent to the caller.

3. The computer-implemented method of claim 1, wherein determining whether to provide the automated response to the incoming call comprises:
    responsive to the computer identifying the incoming call, determining, by the computer, whether a voice channel on the user equipment is already active; and
    responsive to the computer determining that a voice channel on the user equipment is already active, determining, by the computer, to provide the automated response to the incoming call.

4. The computer-implemented method of claim 1 further comprising:
    collecting, by the computer, call information for a plurality of calls between the caller and the operator of the user equipment, wherein the call information that is collected comprises spoken words that were spoken during the plurality of calls between the caller and the operator of the user equipment; and
    analyzing the call information, by the computer, to determine the characteristics of communications between the caller and the operator of the user equipment.

5. The computer-implemented method of claim 1 further comprising saving the personalized automated voice response in a tone bank for the operator of the user equipment, wherein the tone bank is maintained by the telecommunication network and identifies the personalized response message that is automatically sent to the caller.

6. A computer for generating a personalized automated voice response in a telecommunications network, comprising:
    a bus system;
    a storage device connected to the bus system, wherein the storage device stores program instructions; and
    a processor connected to the bus system, wherein the processor executes the program instructions to:
        identify an incoming call from a caller for user equipment of an operator in the telecommunications network;
        responsive to identifying the incoming call, determine whether to provide an automated response to the incoming call;
        responsive to determining to provide the automated response to the incoming call, generate a personalized response message from the operator of the user equipment to the caller based on characteristics of communications between the caller and the operator of the user equipment;
        record a voice of the operator of the user equipment from a voice call between the caller and the operator of the user equipment;
        generate the personalized automated voice response comprising the personalized response message in a synthesized voice of the operator of the user equipment using the recorded voice of the operator of the user equipment and voice cloning; and
        send the personalized automated voice response to the caller.

7. The computer of claim 6, wherein the personalized automated voice response is generated by the telecommunication network and automatically sent to the caller.

8. The computer of claim 6, wherein the processor executes the program instructions to determine whether to provide the automated response to the incoming call by:
    responsive to identifying the incoming call, determining whether a voice channel on the user equipment is already active; and
    responsive to determining that a voice channel on the user equipment is already active, determining to provide the automated response to the incoming call.

9. The computer of claim 6, wherein the processor executes the program instructions to:
    collect call information for a plurality of calls between the caller and the operator of the user equipment, wherein the call information that is collected comprises spoken words that were spoken during the plurality of calls between the caller and the operator of the user equipment; and
    analyze the call information to determine the characteristics of communications between the caller and the operator of the user equipment.

10. The computer of claim 6, wherein the processor executes the program instructions to save the personalized automated voice response in a tone bank for the operator of the user equipment, wherein the tone bank is maintained by the telecommunication network and identifies the personalized response message that is automatically sent to the caller.

11. A computer program product for generating a personalized automated voice response in a telecommunications network, the computer program product comprising a computer-readable storage medium having program instructions embodied therewith, the program instructions executable by a computer to cause the computer to perform the method of:
identifying an incoming call from a caller for user equipment of an operator in the telecommunications network;
responsive to identifying the incoming call, determining whether to provide an automated response to the incoming call;
responsive to determining to provide the automated response to the incoming call, generating a personalized response message from the operator of the user equipment to the caller based on characteristics of communications between the caller and the operator of the user equipment;
recording a voice of the operator of the user equipment from a voice call between the caller and the operator of the user equipment;
generating the personalized automated voice response comprising the personalized response message in a synthesized voice of the operator of the user equipment using the recorded voice of the operator of the user equipment and voice cloning; and
sending the personalized automated voice response to the caller.

12. The computer program product of claim 11, wherein the personalized automated voice response is generated by the telecommunication network and automatically sent to the caller.

13. The computer program product of claim 11, wherein the program instructions are executable by the computer to cause the computer to determine whether to provide the automated response to the incoming call by:
responsive to identifying the incoming call, determining whether a voice channel on the user equipment is already active; and
responsive to determining that a voice channel on the user equipment is already active, determining to provide the automated response to the incoming call.

14. The computer program product of claim 11, wherein the program instructions are executable by the computer to cause the computer to:
collect call information for a plurality of calls between the caller and the operator of the user equipment, wherein the call information that is collected comprises spoken words that were spoken during the plurality of calls between the caller and the operator of the user equipment; and
analyze the call information to determine the characteristics of communications between the caller and the operator of the user equipment.

15. The computer program product of claim 11, wherein the program instructions are executable by the computer to cause the computer to:
record a voice of the operator of the user equipment from a voice call between the caller and the operator of the user equipment; and
generate the personalized automated voice response using the recorded voice of the operator of the user equipment and voice cloning.

16. The computer program product of claim 11, wherein the program instructions are executable by the computer to cause the computer to save the personalized automated voice response in a tone bank for the operator of the user equipment, wherein the tone bank is maintained by the telecommunication network and identifies the personalized response message that is automatically sent to the caller.

* * * * *